US005296252A

United States Patent [19]

Mendenhall

[11] Patent Number: 5,296,252

[45] Date of Patent: Mar. 22, 1994

[54] SLIT FRUIT OR VEGETABLE PRODUCT

[75] Inventor: George A. Mendenhall, Boise, Id.

[73] Assignee: Lamb-Weston, Inc., Tri-Cities, Wash.

[21] Appl. No.: 985,738

[22] Filed: Dec. 4, 1992

Related U.S. Application Data

[60] Continuation of Ser. No. 814,415, Feb. 3, 1992, abandoned, which is a division of Ser. No. 696,180, May 6, 1991, Pat. No. 5,097,735.

[51] Int. Cl.$^5$ ........................ A23L 1/212; A23L 1/216

[52] U.S. Cl. ........................ 426/615; 426/637

[58] Field of Search ........................ 426/615, 637, 518

[56] References Cited

U.S. PATENT DOCUMENTS

| | | | |
|---|---|---|---|
| 3,687,688 | 8/1972 | Stapley et al. | 426/637 X |
| 3,874,259 | 4/1975 | Chambos et al. | 83/423 X |
| 3,952,621 | 4/1976 | Chambos | 83/733 |
| 4,387,111 | 6/1983 | Mullender | 426/637 X |
| 4,447,459 | 5/1984 | Balboni et al. | 426/637 X |
| 4,926,726 | 5/1990 | Julian | 83/865 X |
| 4,979,418 | 12/1990 | Covert et al. | 83/865 |
| 4,999,204 | 3/1991 | Gibson | 426/641 X |
| 5,010,796 | 4/1991 | Mendenhall | 83/865 |
| 5,030,472 | 7/1991 | Logan | 426/641 |
| 5,035,915 | 7/1991 | Mendenhall | 426/637 |

OTHER PUBLICATIONS

Nemco Bulletin, Nemco Inc.

*Primary Examiner*—Arthur L. Corbin
*Attorney, Agent, or Firm*—Klarquist, Sparkman, Campbell, Leigh & Whinston

[57] ABSTRACT

A food product, suitable for slicing into helical strips, comprising a whole fruit or vegetable having an outer surface, a longitudinal center axis and a plurality of penetration slots which extend radially inwardly from the outer surface to the longitudinal center axis.

15 Claims, 11 Drawing Sheets

SLIT FRUIT OR VEGETABLE PRODUCT

This application is a continuation of application Ser. No. 07/814,415, filed on Feb. 3, 1992, now abandoned, which is a divisional of application Ser. No. 07/696,180, filed on May 6, 1991, now U.S. Pat. No. 5,097,735.

BACKGROUND OF THE INVENTION

1. Technical Field

This invention generally relates to a new helical spiral food product shape and a method and apparatus for making the same. More particularly, it relates to a helical spiral food product such as a french fry and a food product cutting apparatus which includes a penetration blade for piercing a food product along its longitudinal axis immediately before the food product is fed into a helical ring cutter blade assembly so as to cut helical spirals of food product of more uniform length.

2. Background Art

While the industrial context within which the present invention was developed is the processing of whole fresh potatoes into french fry type cut food pieces, it should be clearly pointed out that the present invention is amendable for use with any food product that can be cut into helical spiral pieces, including beets, carrots, zucchini, radishes and apples, as well as most other vegetables and fruits. For purposes of this disclosure, the food product being processed is the potato, however it should be apparent to those skilled in the art that food product shapes, the methods, processes and apparatus for making the same, are equally applicable to most other fruits and vegetables.

The traditional American french fry is a well accepted food and method of serving potatoes both here in the United States and in western Europe. Indeed, it is rapidly gaining wide acceptance around the world. As a result, a large industry has grown up around the french fry, starting with sophisticated horticultural practices, through crop storage, to processing whole potatoes into frozen french fries, and finally, to supermarkets, restaurants, fast food chains and the dining room table. This industry is, of course, consumer driven. It is the consuming population that generates the demand and growth within the industry.

The typical configuration for the standard french fry has, in general terms, been dictated by the shape of the potato. The most desirable types of potatoes used for processing into french fries are the varieties which produce the largest tuber potato. For example, and for purposes of illustration throughout this specification, the Russet Burbank potato variety commonly grown in the State of Idaho and the eastern regions of the States of Washington and Oregon will be used as an example. This potato is generally oblong in shape and, for french fry processing, has a minimum size of approximately three inches in length by two inches in width. As a result, it can be generally described as having a longitudinal axis running through its center, along its length and a shorter transverse axis passing through the center point of the potato at its widest point.

For processing of the standard french fries, the potato is cut along and parallel to its longitudinal axis in generally rectangular configurations to produce long french fry pieces preferably of uniform cross sectional areas. It is important that the french fries be of a relatively uniform cross sectional area because they are bulk processed and cooked.

The typical french fry processing operation involves peeling the whole potatoes and then passing them either through mechanical or hydraulically driven potato cutters wherein the raw, whole potato is cut into french fry pieces. These cut food pieces are then blanched to break down certain enzymes and par fried in preparation for freezing. Typically, blast freezers are used to quick freeze the cut, blanched and par fried french fry pieces prior to packaging.

Because of the volumes of french fry pieces being processed in any given processing plant, the cross sectional area, and more importantly the uniformity of cross sectional area, and how the cut french fry pieces tangle together are particularly important factors in the blanching, par frying, freezing and packaging processes. Ideally, the cut french fry pieces will be of uniform cross sectional area, and not tangled too much together so as to lay against one another and form large mass areas which would require additional processing time for blanching, par frying and freezing. After they are cut, they are grade inspected for removal of nonuniform and below grade quality pieces.

Given all of these processing and cooking considerations, it must still be kept in mind that the industry is consumer demand driven. There is a constant and continuing demand for new shaped french fry cuts. As a result, efforts have been made to develop novel shaped french fries such as french fries formed in the shape of fish, or the letter M, or a variety of other geometric shapes as shown in my patent, United States No. 4,911,045, dated Mar. 27, 1990. While decorative cut french fries can and are produced using these processes, it increases the costs of processing since it is a two stage process. First, the core of the potato must be cut into a decorative shape, then, secondly, in an independent cutting process, the core must be cross sliced to form french fry size pieces.

One shape, developed a number of years ago, has found popular acceptance with the consuming public, but which presents problems for the processor and restaurateur, is the helical spiral french fry commonly known as the curly french fry. These helical spirals of french fry pieces are cut mechanically by a process of engaging the potato, end on, into a rotating cutter blade assembly having a plurality of ring cutters extending normally out from the blade and a shear blade similar to the cutter blade assembly shown in FIG. 3. As the potato is pushed continuously into engagement with the rotating cutter blade, the ring cutters continuously dig into and cut concentric rings in the potato core. These concentric rings are then sheared from the body of the potato by the shear blade and pass through a hole in the cutter blade assembly to the other side. This results in the formation of helical spirals of cut potato pieces of varying concentric diameters and perhaps more importantly, of greatly varying lengths. With potatoes, as with most fruits and vegetables, when cut, the spiral shaped cut pieces relax, and as a result they expand out from the closed, tightly wound configuration to a more open spiral. With potatoes, the typical expansion usually ranges from 100% to 200%. If helical spirals are cut from potatoes that are six to eight inches long, this will result in helical spirals, after they have relaxed, of twelve to twenty four inches in length, which if straightened out, can literally be several feet long.

These helical spirals are too long for a number of reasons. First, the relaxed or opened spirals interlock. The relaxed spirals of food product are flexible, and it is difficult and time consuming to manually separate interlocked twenty four inch spirals of cut potato. Secondly, they are too long for convenient processing and packaging. And finally, these long spirals have a propensity to break during processing. In fact, because of the processing and packaging problems, commercial processors intentionally allow the breakage of the long spirals so as to create a collection of shorter, more manageable spiral pieces. The problem is that the long spirals will break into various random lengths ranging from partial arcs to pieces several inches long.

While these collections of random length pieces are usually short enough and adequate for processing, the random length collections themselves present problems, primarily with portion sizing for both packaging and individual serving sizes. Additionally, the random lengths result in a rather unattractive or untidy food plate presentation when served.

Accordingly, what is needed, is a helical spiral shaped food piece that is short enough in length so that it will not be readily susceptible to breakage during processing, thereby eliminating the random lengths collections. A second object is to be able to produce short spirals of predetermined, and uniform, radial lengths.

A third object of this invention is to provide a cutting apparatus which can cut spiral shaped food product pieces of uniform radial length in a single cutting process, thus eliminating the requirement for a second cutting stage wherein a potato core is cross sliced.

DISCLOSURE OF THE INVENTION

These objects are achieved by production of a helical spiral food piece having a predetermined and uniform number of spirals or portions thereof which is cut from a whole food product by use of a cutting blade apparatus wherein a plurality of spaced apart penetration slots are first pierced into the whole food product along the longitudinal axis of the whole food product prior to the food product being forced into engagement with a helical spiral cutter blade assembly. In this manner, when the helical spiral cutter which is cutting into the potato reaches a penetration slot, the continuous spiral of cut food product is broken and a new spiral is begun. By adjusting the spacing and the radial location of the penetration slots, the number of spirals or radians of arc for each cut food piece can be predetermined.

The whole potato is first deposited upon and aligned along its longitudinal axis in a conveyor belt assembly which utilizes a plurality of stacked tensioner assemblies which are configured to hold two sets of opposing endless loop conveyor chains or belts, at right angles to each other to form a transport channel which is slightly smaller than the size of the potatoes to be conveyed to the cutter assembly. The food transport channel is formed of four endless loop conveyor chains or belts which begin their loop at the top of a hopper, from where they travel down along the sides of the hopper into a parallel spaced, four-sided configuration, to form the transport channel. The belts then continue on, in the configuration of the transport channel, down through a series of tensioner assemblies to the top of the rotating cutter head assembly, then out around drive pulleys, back up through a primary tensioning assembly, and back to and over the top of the hopper.

It is useful to define a three dimensional set of coordinate axis in analyzing both the location of the penetration slots and the function of the tensioner assemblies, with the central axis of the longitudinal food passageway being defined as the z axis, and a planar coordinate axis normal to the z axis, and defined by an x axis transversely crossing between a first pair of opposing belts, and a y axis transversely crossing between the second pair of opposing belts. Each tensioner assembly has two pairs of opposing chain sprocket or belt roller assemblies which, when unloaded, hold in alignment the conveyor chains or belts forming the sides of the longitudinal passageway. Each tensioner assembly has as its basic frame member, a baseplate, above which are held, in spaced relationship, two rotatable cam rings, one of which functions to allow tensionally controlled release of two opposing chain or belt rollers outward along the x axis and the remaining two chain or belt roller assemblies outwardly along the y axis so as to accomplish two functions, the first to maintain a minimum set point tension on each individual potato, regardless of its size and shape, and secondly to center each individual potato with its longitudinal axis generally coincident to the centerline of the food passageway, or z axis, as the potato passes down through the passageway formed of the conveyor belts.

Each pair of opposing roller chainbelt assemblies have a central, slidable, shaft, to which at one end is attached a yoke and chain sprocket or belt roller, and at the other end a roller cam yoke, and a cam roller. Each cam roller interfits into an arcuate slideway which is formed integral with, and spirals out from, the center of a cam ring. When a potato passing down through the food passageway encounters a chain sprocket or belt roller, it will laterally displace the roller out along its axis, either x or y. The chain sprocket or belt roller, which is held in a slide block attached to the base plate of tensioner assembly, is laterally displaced out, with the cam roller traveling within the arcuate cam slideway within the cam ring. This in turn rotates the cam ring in relation to the fixed base plate thereby imparting an equal, reciprocal, outward displacement to the roller assembly opposite the one impacted by the traveling potato, thus providing a centering action by the cam ring to center the potato along the z axis.

The longitudinal food passageway is sized to be slightly smaller than the minimum food product size of the food product to be cut, thus insuring that each food product piece passing down through the longitudinal food passageway displaces the sprockets or belt rollers of the tensioner assemblies, thereby insuring that each food product piece is centered, regardless of its size and shape, at the time that it is pulled into the rotating cutter head assembly.

Tensioning of the conveyor chains or belts is accomplished through the use of three separate systems, the first is the primary tensioning of the chains or belts by a constant tension assembly which is spring loaded to hold each chain or belt in uniform and constant tension. The roller assemblies are themselves tensioned by means of tensioning springs connected between the slide blocks which are fixed to the base plate, and the slidable roller assembly shafts which hold the chain sprockets or belt rollers. When the roller assemblies are unloaded, they are biased by these springs in an inwardly extended position to maintain the minimum size for the longitudinal food passageway, and provide a predetermined and selectable tensional bias against outward displacement. Additional tensional bias against outward displacement of the chain sprockets or belt rollers is provided by a secondary set of tensioning springs which can be utilized to bias the cam rings against rotation induced by displacement of the roller assemblies and the interconnecting cam rollers.

In order for the conveyor belt system to work, it is essential that each endless loop of conveyor chain or belts be driven at precisely the same speed. Provided is a synchronized drive pulley system which has four drive sprockets or pulleys, one for each of the conveyor loops, each interconnected one to the other by means of drive shafts and right angled beveled gear assemblies. Motive power is provided by a conventional electric motor, preferably powered by a variable frequency converter so as to provide an adjustable speed feature.

The potatoes so held, as they are traveling along through the longitudinal channel, pass in front of at least one penetration blade assembly having a plurality of penetration blades which are spaced at intervals equal to multiples of the width of the cut food pieces. The penetration blade assembly is attached to a double action air activated cylinder which is designed to punch the penetration blades, which are aligned along the z axis, into the whole food product all the way to the central longitudinal axis of the food product so as to form a series of spaced apart penetration slots along the longitudinal or z axis of the potato in to the center longitudinal axis of the potato.

The potato is then urged into engagement with a cutter blade assembly, the cutter blade assembly being a rotating wheel plate having a planar surface. Attached to, and extending out normally from the planar surface are a plurality of concentric ring cutting blades which continuously cut concentric rings into the pulp of the potato. A shear blade, angularly mounted and extending out from the planar surface of the wheel plate, then shears the concentric rings off the potato as the wheel plate rotates about its axis. The helical spiral pieces sheared by the shear blade then pass through a transport hole formed in the wheel plate into a central opening of a rotating hub to which the cutter blade assembly is attached.

Without the penetration slots, the cutter blade assembly would cut continuous helical spirals. However, as the shear blade passes each slot, the helical spiral is terminated, and as a result, helical spiral food pieces of a predetermined number of spirals are formed.

Since the longitudinal width of each slot is the same as the cross sectional area of the spiral pieces, and the longitudinal spacing of the penetration slots is, in the preferred embodiment, a multiple of the thickness of the cut food piece, the end product is a plurality of concentrically sized helical spirals of cut food product, the majority of which have a uniform number of helical spirals.

BEST MODE FOR CARRYING OUT INVENTION

Figure 1:
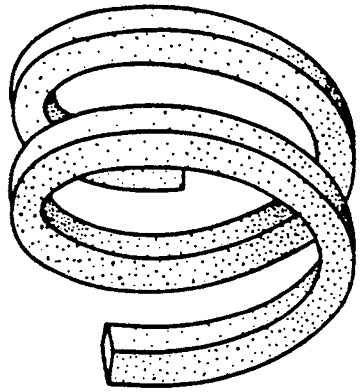
FIG. 1 is a perspective representation view of a helical spiral cut food piece having two complete spirals.

Referring to FIGS. 1, 3, 4, and 5, the helical spiral cut food piece 10 is shown and the apparatus by which it is made is shown conceptually. Cutter blade assembly 200 is formed of wheel plate 202 having front planar surface 204. Wheel plate 202 rotates about central axis 206.

Attached to and extending normally out from wheel plate 202 and planar surface 204 are ring cutters 208 designed to cut concentric rings into the body of potato 14. Shear blade 210 is mounted generally opposite ring cutters 208 and is designed to shear off concentric rings of cut potato pieces as wheel plate 202 rotates about central axis 206. A hollow core cutter tube 218 extends normally up from planar surface 204 coincident with central rotational axis 206. Core cutter 218 is provided with incline core cutter edge 220, and functions as a centering pin for holding potato 14 stationary with respect to central axis 206 as it is fed into cutter assembly 200. The concentric pieces cut from the potato are forced, as they are sheared from potato 14, through transport hole 212 into central opening 214 in rotating hub 226.

Figure 3:
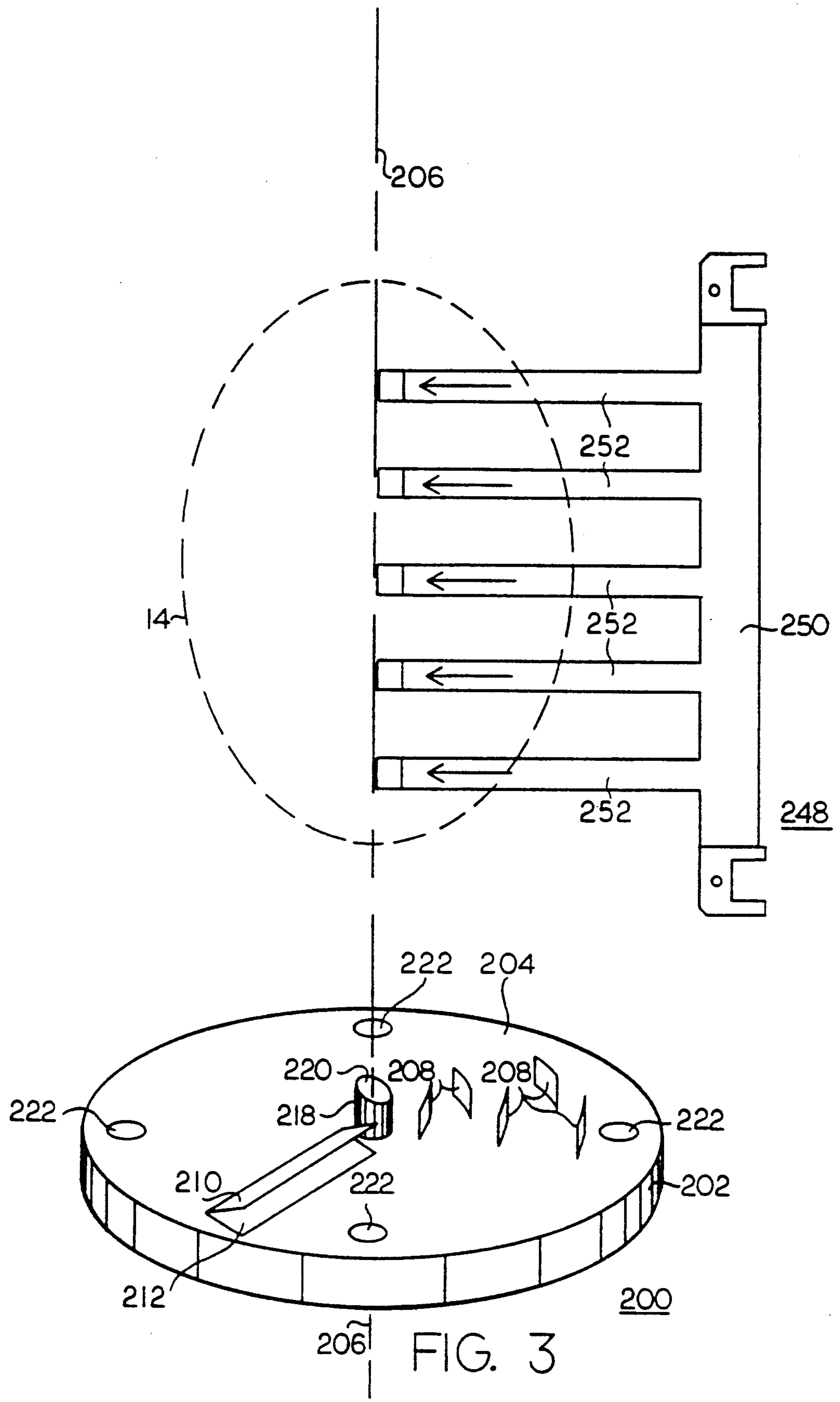
FIG. 3 is a perspective representational view of the rotating cutter blade assembly and penetration blade assembly and their orientation relative to each other.
Figure 4:
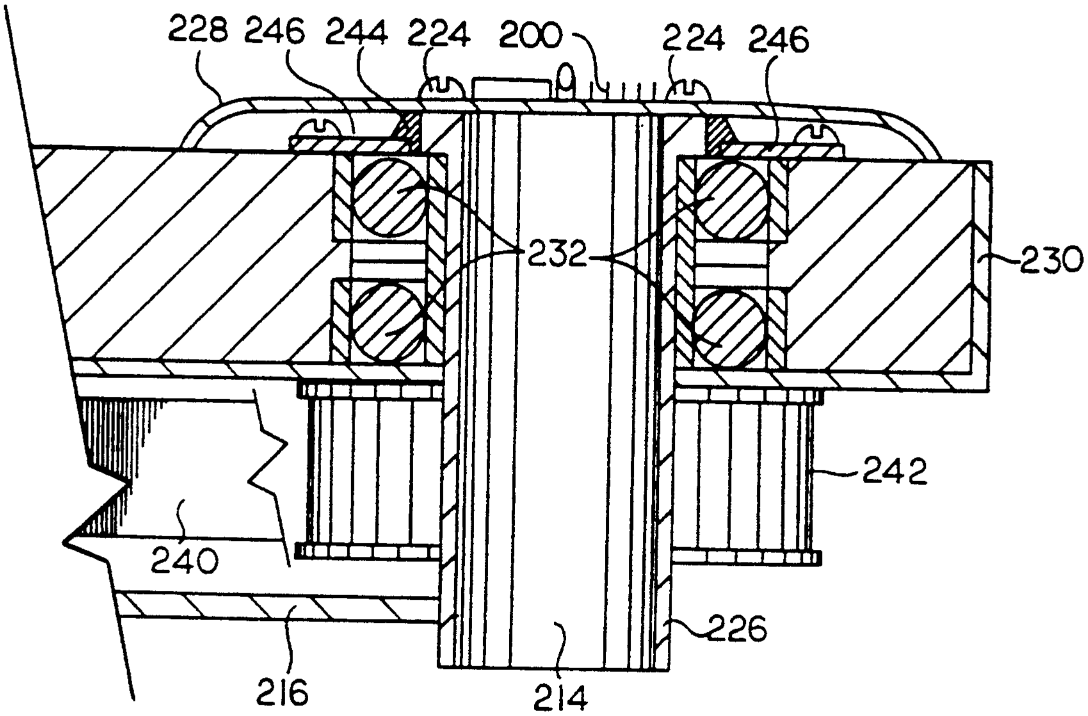
FIG. 4 is a perspective representational side view of the cutter blade assembly.

As can be seen in FIGS. 3 and 4, cutter blade 200 is mounted by means of bolts 224 passing through bolt holes 222 to rotating hub 226. Also extending radially out from cutter blade 200 is water sling plate 228 which protects the seal assembly found at the interface between cutter head assembly 200 and hub housing 216.

For purposes of simplicity in this beginning portion of the best mode for carrying out the invention, only that portion of the mechanical assembly that concerns rotating hub 226 is shown and described. In general terms, the rotating hub unit is designed to be held in one containment housing 216, thus providing for simple and easy removal of hub 226 and the cutter head assembly 200 for purposes of daily maintenance and cleaning.

Figure 7:
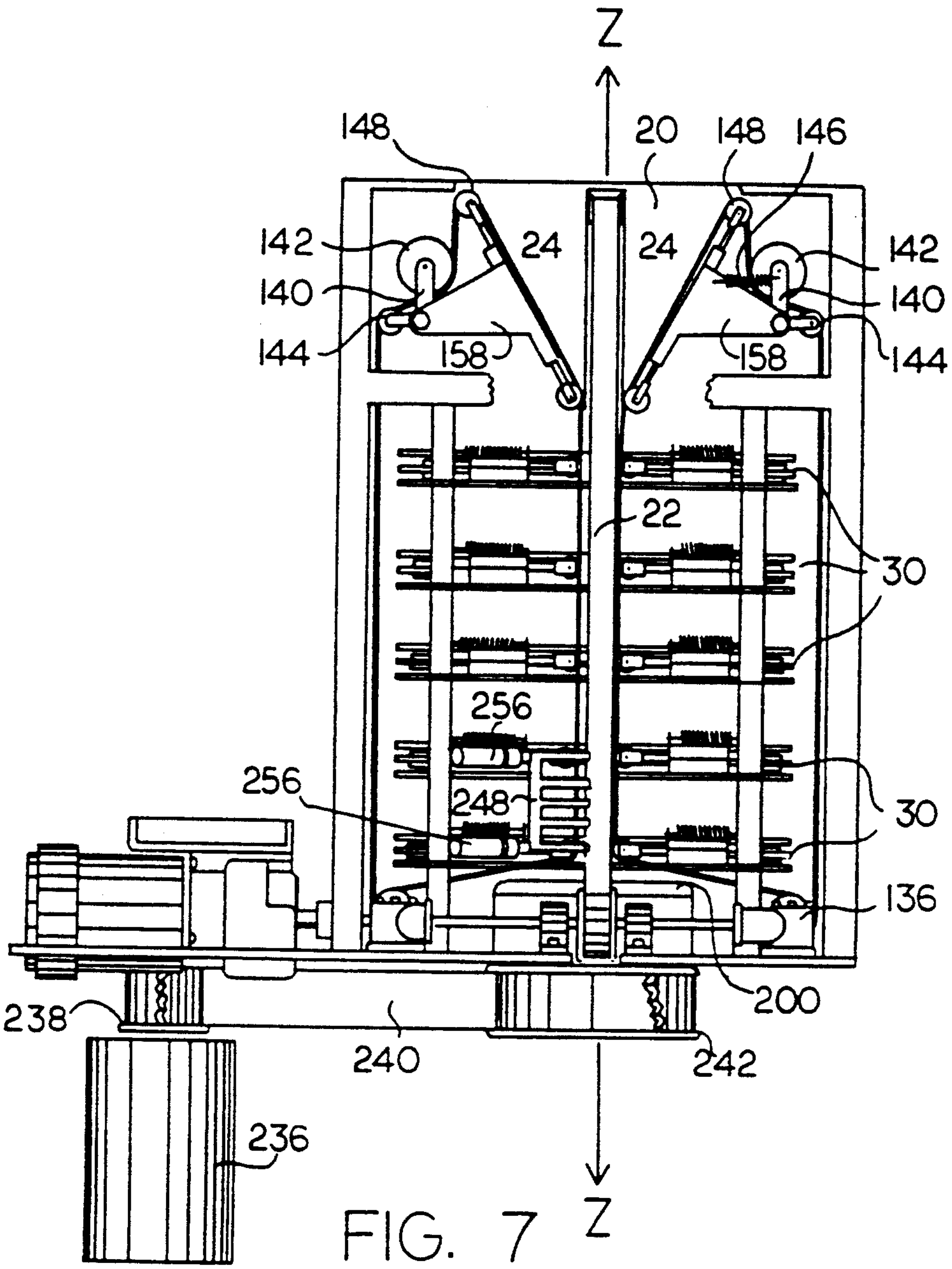
FIG. 7 is a sectional side view of the cutter, penetration blade and conveyor assemblies.

Hub 226, as shown in FIG. 4, is supported for rotation within containment housing 216 by means of ball bearing assemblies 232. Hub 226 is provided with central opening 214 which provides a discharge means for cut food pieces 10, 12 exiting cutter assembly 200 through transport hole 212. As shown in FIGS. 4 and 7, rotational drive for hub 226 and cutter head assembly 200 is provided by means of electric motor 236, drive sprocket 238, drive belt 240 and hub sprocket 242.

As with any food processing equipment, care must be taken so that oil and other lubricants for the mechanical equipment do not contaminate the food cutting surfaces. In this regard, seal ring 244 is held by circular holding ring 246 to prevent lubricants from contaminating cutter blade assembly 200 and the interior surfaces of hub 226 which come in regular contact with food product. Additional protection for seal ring 244 is provided by sling plate 228 which extends out from the rotating cutter head assembly 200 to provide a barrier for splashing water and fluids as the potatoes are being cut.

If, as shown in FIG. 3, potato 14 were to be fed directly down through central axis 206 which is coincident to the longitudinal axis of potato 14, and is also identified elsewhere in this specification as the z axis, then potato 14 would eventually become impaled upon the incline core cutter edge of 220 of core cutter 218, which would lock potato 14 in place relative to the z axis of rotation 206 as it is fed into rotating cutter assembly 200. If this were all that were done, then potato 14 would be cut into five concentric continuous helical spirals which would have approximately fifteen complete spirals each and would in practice, after relaxing, be approximately several inches long.

In order to achieve the double helical spiral cut food piece 10 as shown in FIG. 1, a series of penetration blades 252 are attached to penetration blade frame 250 and designed to pierce into the core of the potato to its longitudinal center line, which is also coincident to the axis of rotation 206 of cutter blade assembly 200, thus forming a plurality of evenly spaced, longitudinally oriented penetration slots.

As potato 14 is urged forward into engagement with cutter blade assembly 200, ring cutters 208 and shear blade 210 commence cutting a plurality of concentric continuous helical spirals of cut food pieces. However, as shear blade 210 passes a penetration slot previously cut into potato 14 by penetration blades 252, the length of each cut piece terminates and the result is a plurality of concentric helical spiral cut food pieces having a predetermined number of radians of spiral.

The length of each cut food piece formed is thus determined by the longitudinal spacing, along the z axis, of penetration blades 252. As shown representationally in FIG. 3, the longitudinal height of each penetration blade 252 is equal to the cross sectional height of each cut food piece as is determined by the height of the cutting edge of shear blade 210 above planar surface 204 of cutter assembly 200. If each of penetration blades 252 are spaced at two multiples of the height of the cross sectional area of cut food piece 10, the result will be cut food pieces having two complete helical spirals as is shown in FIG. 1.

Figure 2:
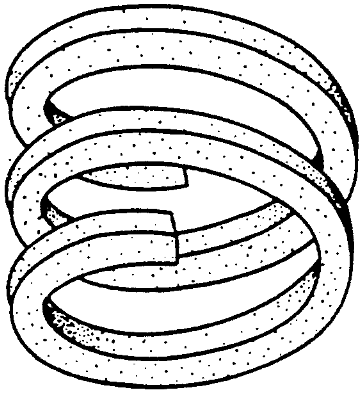
FIG. 2 is a perspective representational view of a helical spiral cut food piece having two and one half spirals.
Figure 6:
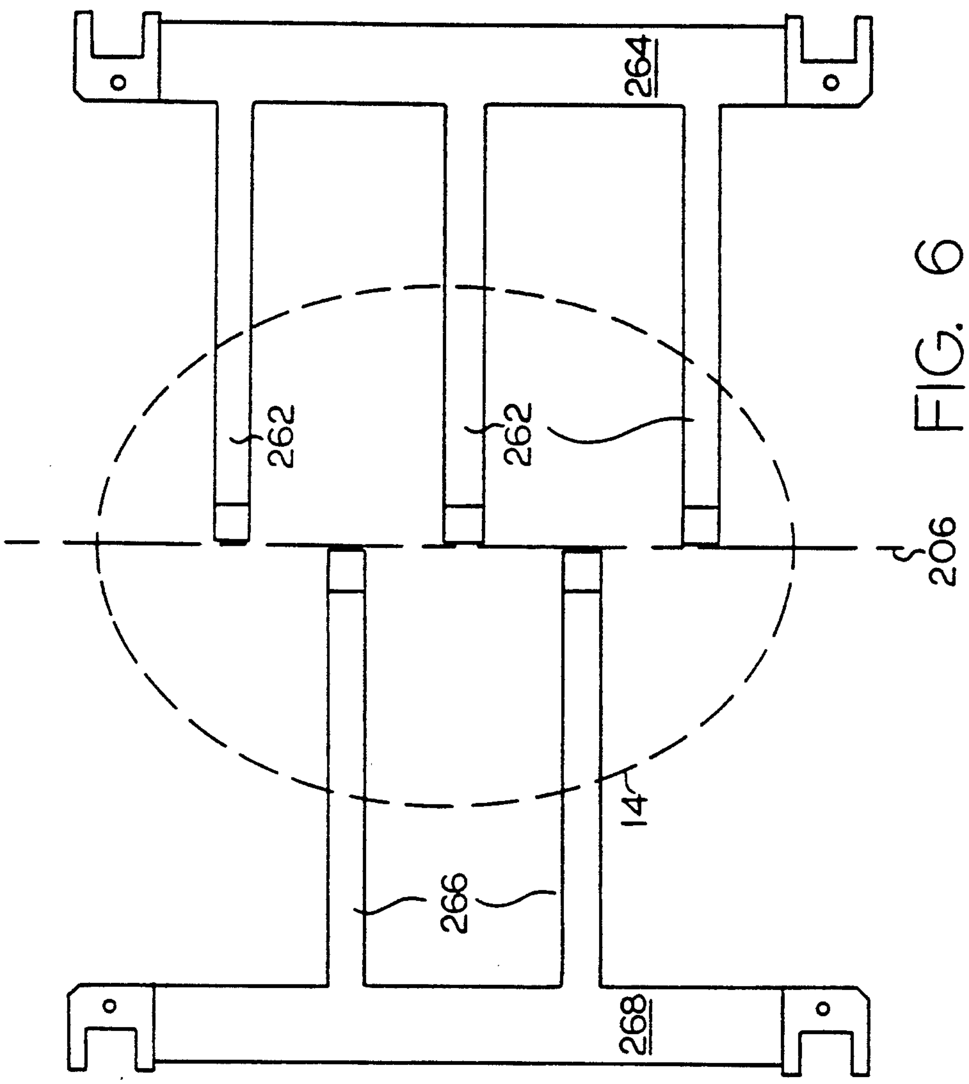
FIG. 6 is a representational side view of an interfitting pair of penetration blade assemblies and their orientation relative to each other.

FIG. 2 shows a helical spiral cut food piece 12 formed to have two and a half spirals to each piece. This can be achieved, as is shown conceptually in FIG. 6, by the use of two penetration blade assemblies, namely right penetration blade assembly 264 having right penetration blades 262 and left penetration blade assembly 268 having left penetration blades 266. In order to achieve two and a half spirals, the right penetration blades 262 are spaced at the fifth multiple of the height of the cross sectional area of the cut food piece 12, and left penetration blades 266, which are also spaced apart at a multiple of five times the height of the cross sectional area of cut food piece 12, but also interfitting midway between each set of right penetration blades 262. Thus, when potato 14 is simultaneously pierced by both left and right penetration blade assemblies 268 and 264, a plurality of penetration slots are formed which will result in the formation of cut food piece 12 which has two and a half spirals of cut food.

In a like manner, it should be apparent that merely by adding penetration blade assemblies and by spacing penetration blades thereon, it is possible to configure any size or number of radians for each cut food piece produced by the present invention. In fact, it is possible to produce anything from a simple partial radian of helical cut food pieces all the way up to any desired number of spirals and portions thereof that are convenient for commercial processing and/or food plate presentation.

Figure 5:
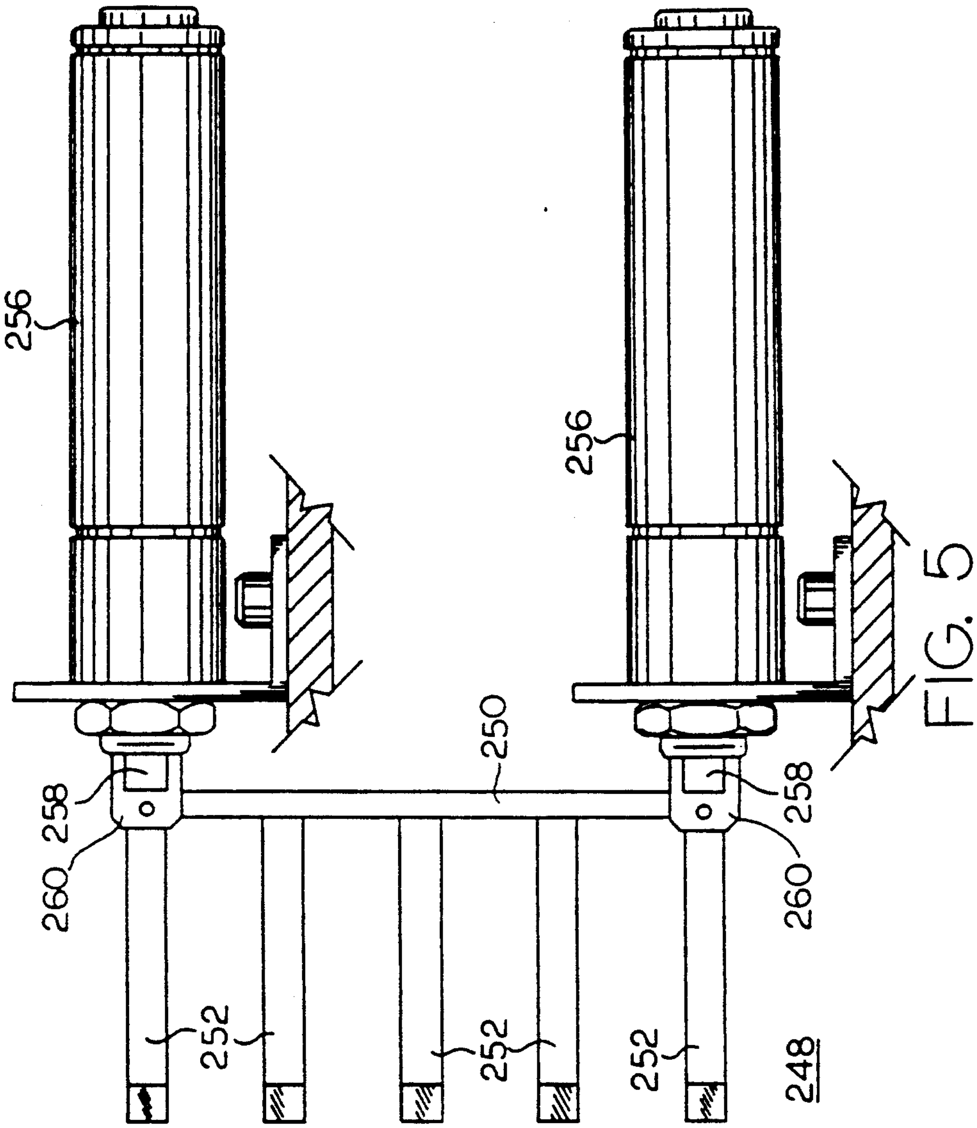
FIG. 5 is a side view of a penetration blade assembly.

When using a rotating cutting blade assembly 200 and penetration blades as shown in FIGS. 3, 4, and 5, it is important that the fruit or vegetable be centered as exactly as possible, giving the irregular fruit or vegetable shape, over the rotational, or z axis, 206 of the cutter assembly. Failure to center the food product to be cut, even by as little as a few millimeters, will result in a substantial increase in waste or scrap pieces. For example, if the potato pieces to be cut are 6 mm. in thickness, a misalignment of 4 mm. will result in the outer cuts of helical spirals being considered scrap and therefore unusable. Additionally, it should be apparent that separating these unusual scrap pieces would be a difficult and time consuming job.

Figure 9:
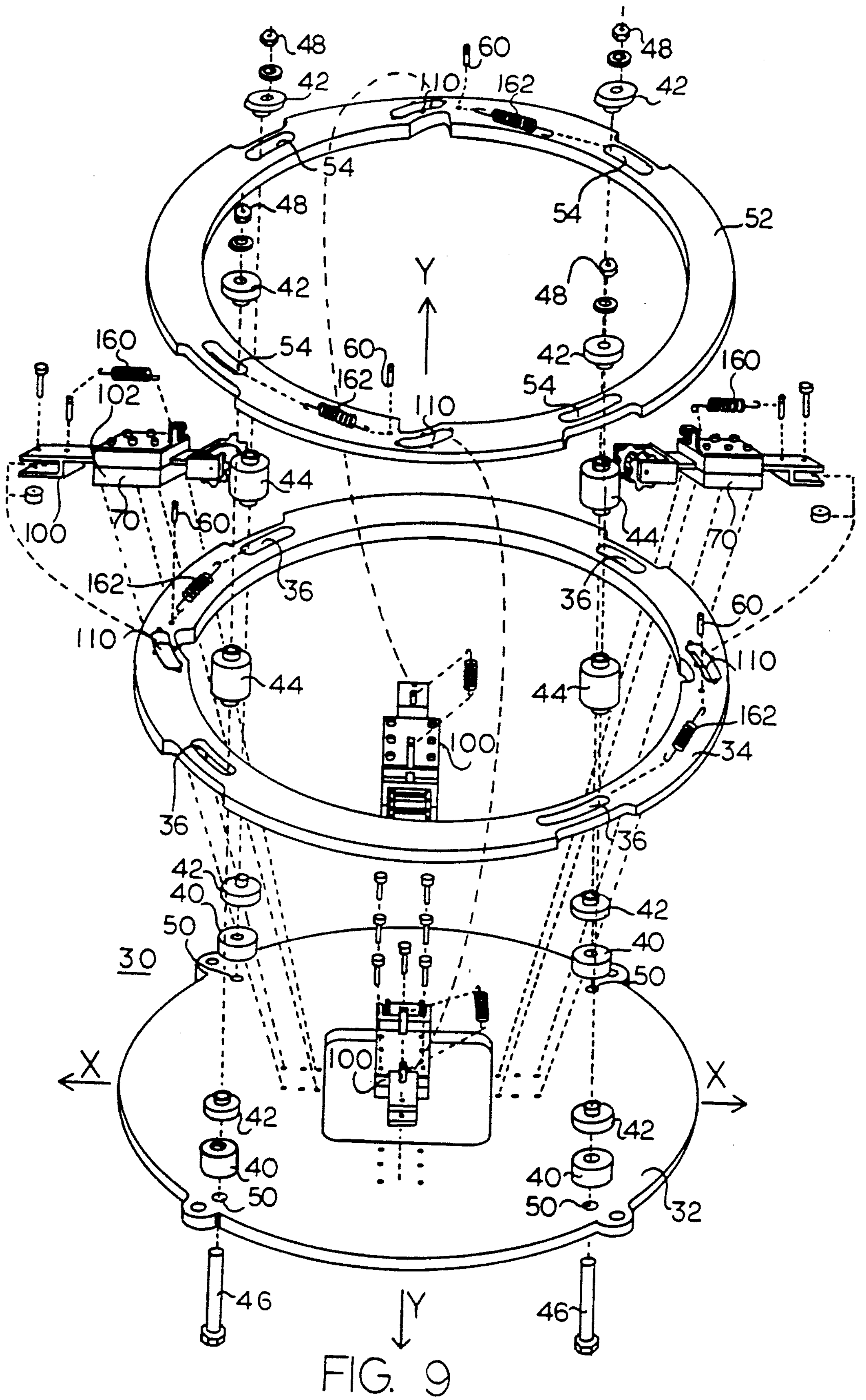
FIG. 9 is an exploded representational perspective view of a tensioner assembly.
Figure 10:
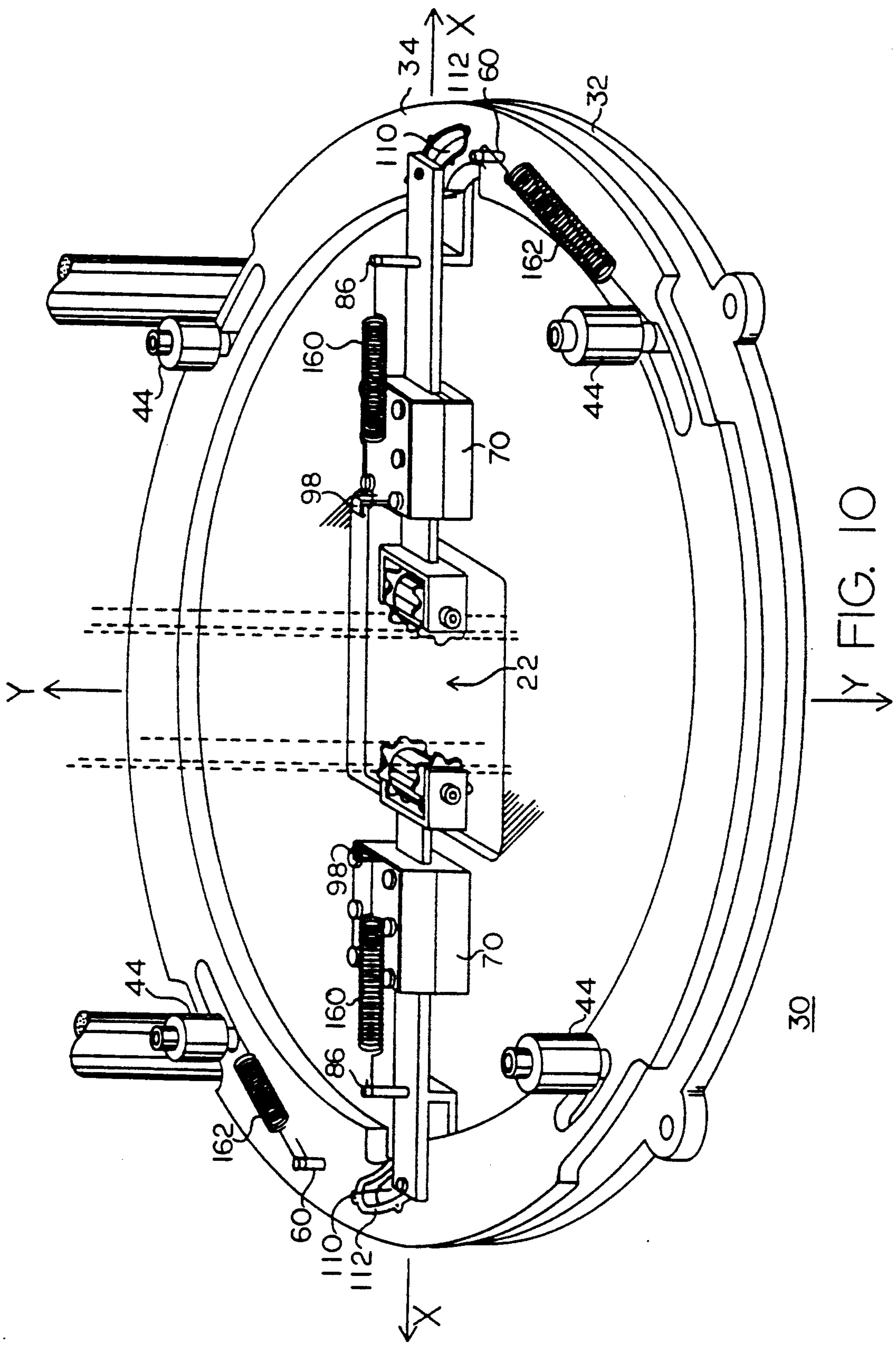
FIG. 10 is a perspective representational view of a tensioner assembly.

Like most fruits and vegetables, potatoes are not of uniform size and shape. For purposes of this description, it will be most useful to orient everything with a consistent, x, y, and z set of axes, with the z axis being the vertical axis in relation to the drawings, and coincident to central axis 206, and the x and y being planar and horizontal, as is shown in FIGS. 9 and 10. Similarly, given the general potato shape as being oblong, for purposes of this specification, that shall be identified as the z axis, or longitudinal axis, with the x and y axis being perpendicular thereto and describing a planar axis set normal to the z axis and would represent a cross-sectional axis relative to the potato. This is of significance in this specification since potatoes, while generally oblong, are not necessarily cross-sectionally round.

It has been found in practice that potatoes deposited into hopper 20 as shown in FIG. 7 will orient themselves so as to pass with their z, or longitudinal axes, in alignment into conveyor channel 22 formed by the four conveyor chains 24 and be pulled down channel 22 into cutting assembly 200. It has also been found in practice that in order to pull the potatoes down the channel with sufficient force to drive them into rotating cutter assembly 200, it is necessary that either chains or rough top surface belts be used, and that they be maintained in such a manner that they are tensioned against each side of the potato with a tensional force of between 25 foot pounds to 80 foot pounds, with the actual tensional force used being dependent upon a number of variable factors including the condition of the potatoes, moisture content, whether or not they have been peeled, and the actual surface conditions of the potatoes. It has also been found in practice that it is necessary to hold each individual potato, from all four sides, with an equal amount of force. While this best mode section describes the use of conveyor chains, it should be pointed out that conveyor belts will also work, and that the conversion from conveyor chains to belts can be accomplished relatively simply by appropriate changes of hardware, such as substituting belt rollers for chain sprockets.

In order to accomplish pulling the potatoes with uniformity, the conveyor chain assembly is provided with a plurality of tensioner assemblies 30 which are configured to hold opposing chains 24 in position to form food transport channel 22 which is slightly smaller than the smallest potato to be conveyed to the cutter assembly.

As potatoes pass down through food channel 22 and past each tensioner assembly 30, the opposing conveyor belts 24 bulge out and around the potato under tension controlled by tensioner assemblies 30. The situation is analogous to a lump of food being swallowed and passed down through the human esophagus, as is often humorously portrayed in cartoon characters as showing lumps sequentially passing through the throat.

If conveyor chains 24 forming food channel 22 were not resiliently held in position by tensioner assemblies 30 and instead relied solely on internal, longitudinal tensional forces within the chains, the variations in cross-sectional sizes and shapes of the potatoes would result in some potatoes being held much more firmly than others and insufficient holding forces would be generated which would result in the conveyor system being unable to drive the potatoes through the rotating cutter blade assembly 200. The conveyor system would quickly plug.

The tensioner assembly 30 shown in FIGS. 9 and 10 is designed to maintain a minimum set point tension on each potato and to independently release tension in both the x and the y axis as potatoes of varying size and cross-sectional shape pass down through food channel 22 and the central core area of tensioner assemblies 30. As can be seen from FIG. 7, a plurality of tensioner assemblies 30 are provided in a stacked array, however, each assembly is identical and functions independent of the others.

Tensioner assembly 30 has as its basic frame member, base plate 32 which is open at its center for passage therethrough of food channel 22 formed of two sets of opposing chains 24. Extending radially inward on the x axis are opposing roller assemblies 70 which are interconnected to function with lower cam plate ring 34, and on the y axis opposing roller assemblies 100 which are interconnected to and operable with upper cam plate ring 52.

Figure 11:
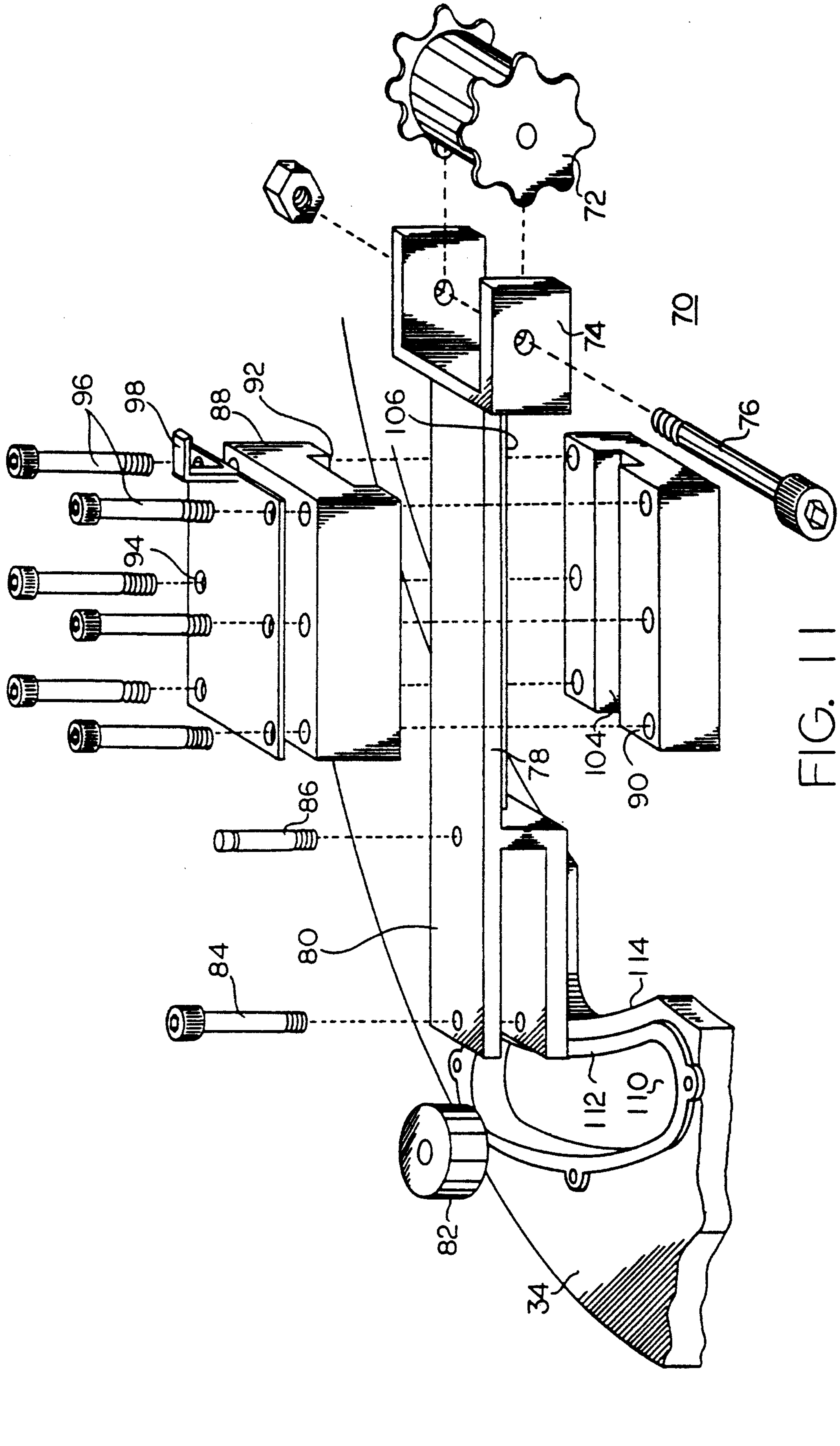
FIG. 11 is an exploded representational view of a roller assembly.

As shown in FIGS. 9, 10 and 11, roller assembly 70 is designed to release tension on chain 24 as an oversized potato passes down through food channel 22. Roller assembly 70 is formed of chain sprocket 72 rotationally held in sprocket yoke 74 by means of axle pin 76. Extending back from sprocket yoke 74 is assembly shaft 78 which although generally flat has provided therein elevated rib 106, whose function will be later described. Chain sprocket 72 is sized and configured to hold in alignment conveyor chain 24. At the opposite end of roller assembly shaft 78 is provided roller cam yoke 80 which holds rotatable roller cam 82 by means of roller cam pin 84. Roller cam 82 is held in position within roller cam slideway 110 in lower cam plate ring 34.

Roller assembly shaft 78 is slidably held between slide block 88 and slide block cover 90 on slide block bearing surface 92 within slide block 88 with elevated rib 106 interfitting within rib slot 104 of slide block cover 90 to prevent lateral displacement of chain sprocket 72.

Roller cam slideways 110 arcuately spiral out from the inner perimeter of both lower cam plate ring 34 and upper cam plate ring 52. The pair of opposing roller assemblies 70 are attached, by means of locking bolts 96 interfitting through slide block cap 94, slide block cover 90 and slide block 88, to base plate 32 along the previously defined x axis. Since roller cams 82 of each of the opposing roller assemblies 70 interfit within roller cam slideways 110, it will result in the rotational displacement of lower cam plate ring 34 when chain sprockets 72 are pushed apart by the passage of a potato through the food channel.

In a like manner roller assemblies 100 are interconnected with roller cam slideways 110 of upper cam ring 52 to provide for identical reciprocal displacement of roller assemblies 100 along the y axis as a potato passes through food channel 22, which is independent of the displacement along the x axis of roller assemblies 70.

Both the lower cam ring 34 and upper cam ring 52 are held in parallel rotational alignment with base plate 32 by means of slide pin bolts 46 which extend up through holes 50 in base plate 32 and up through slide pin slots 36 in lower cam ring 34 and slide pin slots 54 in upper cam ring 52. Spacers 40, together with upper and lower bushings 42 and intermediate bushings 44, are provided to hold lower cam ring 34 and upper cam ring 52 at the appropriate operational level above base plate 32, yet still provide for a limited rotational movement of each of the cam rings.

In practice it has been found that if appropriate spacing is determined, then it is possible to make one roller assembly 70 with unequal elevational characteristics between slide block 88 and slide block cover 90 such that it is possible to connect a single design roller assembly with either lower cam 34 or upper cam ring 52 merely by flipping the roller assembly over. This will simplify manufacturing considerations, since all roller assemblies are the same, it is just their orientation which is different depending upon whether they are interconnected with lower cam ring 34 or upper cam ring 52.

As previously stated, it is of importance that each food product piece passing down through food channel 22 be centered over axis of rotation 206 of cutter assembly 200. This is facilitated by tensioner assemblies 30 and incorporated cam rings 34 and 52, in that the cam rings insure a centering function for tensioner assemblies 30 since displacement of one roller assembly on a cam ring will result in an equal and opposite displacement of the second roller assembly on the same cam ring, thus urging the potato, regardless of its size and shape, toward the center of food channel 22. The use of a plurality of tensioner assemblies 30 in a stacked array, as is shown in FIG. 7, results in a gradual but definite centering of each potato as it travels down through and is adjusted by tensioner assemblies 30 urged toward the center by the reciprocal opposite displacement of the roller assemblies of each tensioner assembly 30.

To maintain uniform tension on the conveyor chains 24 along the entire length of food channel 22, as nonuniformly sized potatoes pass therethrough, two independent sets of tensional adjustment springs are provided. First is the primary tensional spring 160, as shown in FIG. 10, which connects forward spring pin 98 which is fixed along with the slide block assembly to base plate 32, and roller spring pin 86 which is attached to the slidable roller cam yoke 80. Primary tensional spring 160 is used to provide a tensional force to hold roller assembly 70 such that chain sprockets 72 are fully extended inward so as to hold conveyor chains 24 in their closed channel position and to insure a uniform minimum tensional force on chain 24 as food product passes down food channel 22 displacing belt roller assemblies 70 or 100 along either the x or the y axis as the case may be. Secondary tensional adjustment springs 162 are also provided and interconnect between spring posts 60 attached to both lower cam ring 34 and upper cam ring 52 and slide pins 46, so as to provide a tensional force opposing the rotational displacement of lower cam ring 34 and upper cam ring 52 as roller assemblies 70 and 100 are displaced outward from the longitudinal centerline of food channel 22. Tensional adjustment is accomplished by changing the springs. Stronger springs will increase tension, and vice versa for decreased tension, depending upon the food product to be cut.

It should be apparent that the primary wear surface in the tensioner mechanism is between roller cam 82 and the sides of roller cam slideways 110. Accordingly, in the preferred embodiment, cam slideway wear sleeves 112 are provided as wear bearing surfaces.

In practice, for potatoes, it has been found that depending upon the condition of the potatoes and the slipperiness of the surfaces of the potatoes which, in itself is dependent upon plant variety and peeling techniques, it is necessary to maintain a tensional force of between 25 foot pounds to 80 foot pounds on conveyor chains 24. The initial tension or loading, as shown in FIG. 7, is accomplished by use of tensioner sprocket 142 which is rotatably attached to tensioner pivot arm 140. Chain 24, on its return loop back to the top of the hopper, passes over tensioner idler sprocket 144 and under tensioner sprocket 142 up to the top of the hopper and over return sprocket 148. Tensioner pivot arm 140 is pivotally attached to frame member 158. Tensile force is imparted to tensioner sprocket 142 by means of tensioner spring 146 which interconnects between frame member 158 and tensioner pivot arm 140.

Figure 12:
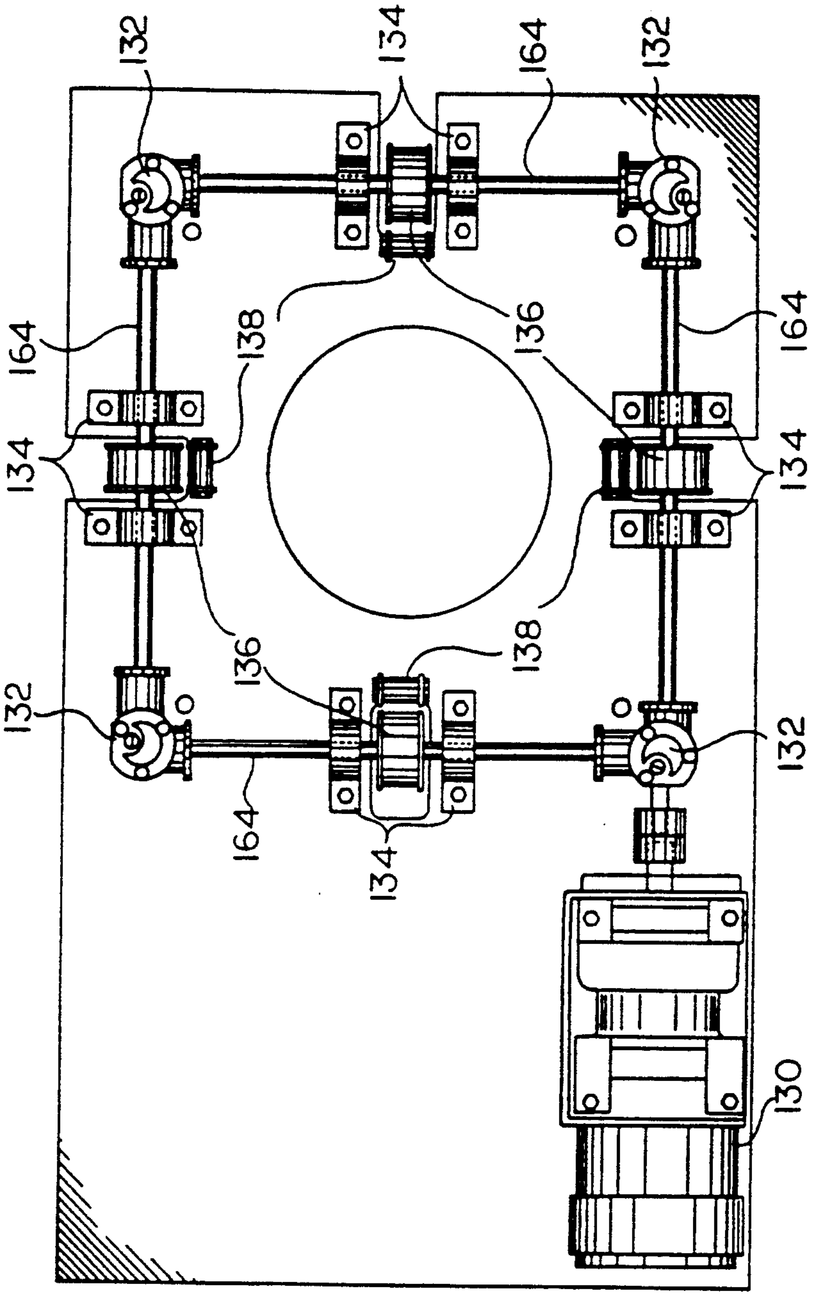
FIG. 12 is a top plan view of the conveyor drive assembly.

As shown in FIGS. 7 and 12, at the lower end of the outside loop for each of the four chains 24 is found drive sprocket 136 and idler sprocket 138. Chains 24 after passing around the lowermost chain sprocket 72 travel down and around idler sprockets 138 and drive sprockets 136.

In order for this conveyor system to work, it is imperative that all four chains 24 be driven at identical, synchronized speeds. This is accomplished by use of an interlocked shaft system having four chain drive shafts 164, each interconnected one to the other by means of right-angle bevel gear assemblies 132. Drive shafts 164 are held firmly in place by means of bearing assemblies 134 which are positioned adjacent to each side of each of drive sprockets 136. Power is provided by a conventional electric motor 130 which is interconnected to one of the right-angle bevel gear assemblies to drive the entire assembly at a synchronized speed. In practice it is necessary to closely control the speed at which the conveyor belt assembly is driven and this is easily accomplished by use of a variable speed frequency converter to adjust the frequency of alternating current being supplied to electric motor 130.

In practice it has been found that potatoes fed into the hopper are agitated and aligned for introduction into food channel 22 by the action of chains 24 passing over the funnel shaped surfaces of hopper 20 as shown in FIG. 7. Potatoes enter the food channel 22, one after the other, with chains 24 being held in uniform tension around each potato, regardless of potato size and shape, by means of tensioner assemblies 30. In practice it has been found that if one potato starts to slip as it is being cut by rotating cutter assembly 200, the potatoes following will continue to move down through channel 22, and eventually butt up against the slipping potato and literally give it an additional push to keep it moving through the conveyor.

Figure 8:
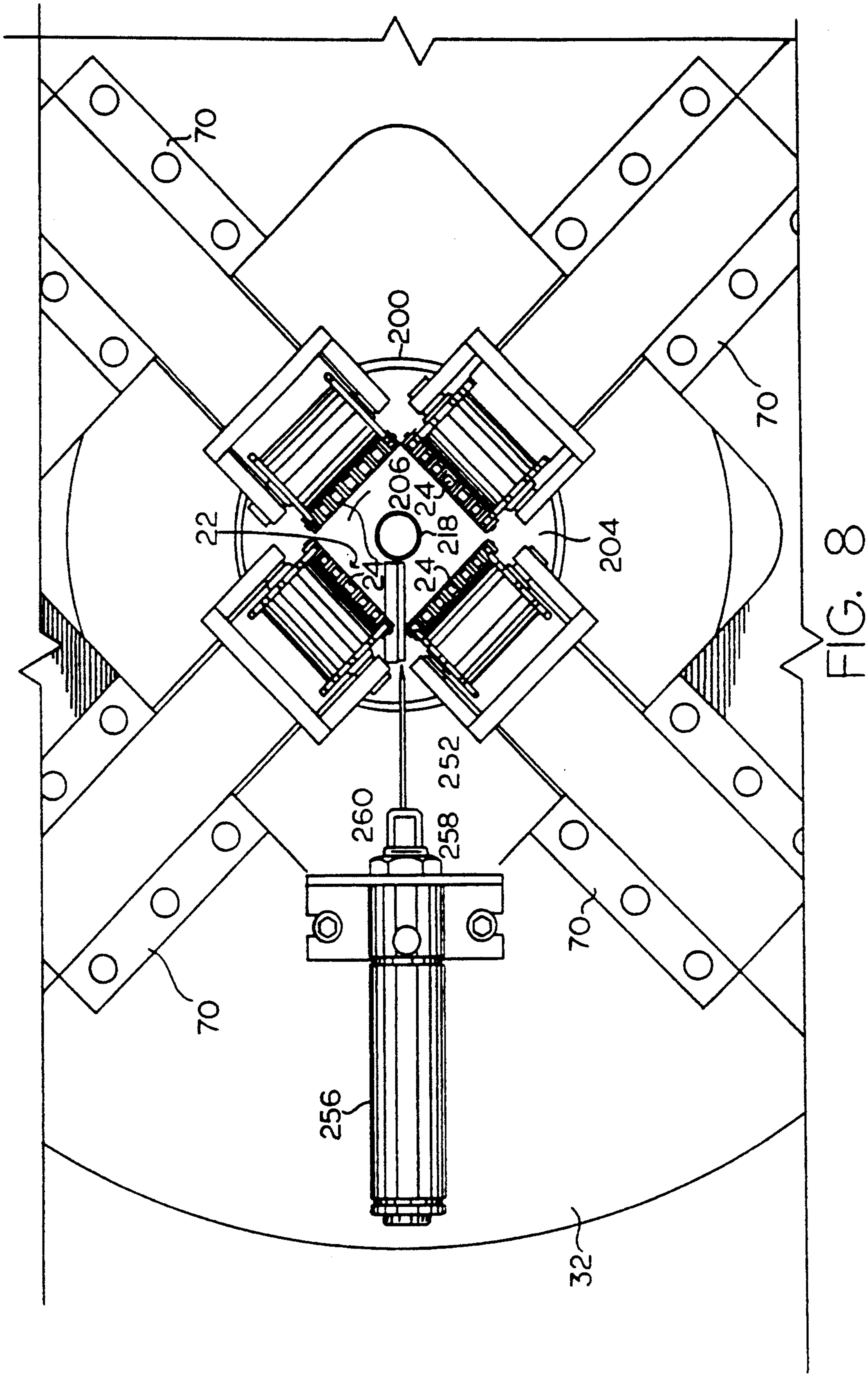
FIG. 8 is a sectional top view of the conveyor, cutter and penetration blade assemblies.

As shown in FIGS. 5 and 7, penetration blade assembly 248 is formed of two double action air cylinders 256 having air rams 258 which are connected by means of blade frame brackets 260 to penetration blade frame 250. While a double action air cylinder is the activation means of choice, there are a number of other ways of doing this, including hydraulic rams and a variety of mechanical actuators. Formed integrally with penetration blade frame 250 are a plurality of spaced apart penetration blades 252. As is shown in FIGS. 7 and 8, penetration blade assembly 248 is mounted to base frame plates 32 of two adjacent tensioner assemblies 30, in a position wherein penetration blades 252 can slip in and out of food channel 22 between two conveyor chains 24 to the central rotational, or z axis 206. In practice it has been found that if double action air cylinders 256 are operable to insert penetration blades 252 into food channel 22 and withdraw them in less than a few hundredths of a second, the potatoes can be quickly pierced without disrupting or impeding their travel down food channel 22 prior to engagement with cutter assembly 200. The operation of penetration blade assembly 248 has, of course, to be timed or synchronized with the speed of conveyor chains 24 so as to pierce each food piece once, and only once, as it passes through food channel 22. This can be done in a variety of well-known ways, including the use of some sort of an optical sensor to sense the position of each food piece, and operable to insert penetration blade assembly 248 when the potato or other food piece is in the correct position for piercing. However, in practice it has been found that the potatoes travel down food channel 22 seriatim with a great deal of uniformity, and that acceptable penetration of each potato can be achieved merely by timing penetration blade 248 to be activated at a regular timed interval.

In a second embodiment, a penetration blade assembly having only one penetration blade 252, can be used in a timed interval mode of operation.

It should also be noted that in order to achieve perfect helical spirals such as those shown in FIGS. 1 and 2, it would be necessary to synchronize the position of shear blade 210 and the rotational speed of cutter assembly 200 relative to the position of the penetration slots formed by penetration blades 252, such that the cut food piece being sheared by shear blade 210 would directly and completely cross paths with the penetration slots. If such were the case, then each cut food piece from potato 14 would, with the exception of the first and the last pieces, be exactly two spirals in length. Unfortunately, such synchronization cannot, in practical terms, be achieved and as a result the cut food pieces being cut off of whole potato 14 by shear blade 210, do not exactly coincide with the penetration slots, which results in helical spiral pieces which are still connected together, but have formed between them notches as a result of the interaction with shear blade 210 with the penetration slots. In practice it has been found that these notches form break points in the long helical spirals, and as a result, the helical spirals, while initially connected, will mostly break under their own weight as they fall through the transport hole and the remainder will break during further processing, resulting in a collection of food product pieces of which the vast majority are the desired length.

While there is shown and described the present preferred embodiment of the invention, it is to be distinctly understood that this invention is not limited thereto but may be variously embodied to practice within the scope of the following claims.

Accordingly, what is claimed is:

1. A food product suitable for slicing into helical strips, comprising:

a whole potato having an outer surface and a longitudinal center axis;

the whole potato having a plurality of penetration slots which extend radially inwardly from the outer surface to the longitudinal center axis;

the slots being spaced apart longitudinally relative to the longitudinal center axis;

the slots having a thickness dimension, a longitudinal width dimension which extends longitudinally in parallel relationship to the longitudinal center axis, and a depth dimension which extends radially inwardly toward and hence substantially perpendicularly to the longitudinal center axis, the depth dimension terminating substantially at the longitudinal center axis.

2. The food product of claim 1 wherein each penetration slot has a width corresponding to a predetermined thickness dimension of the helical strips.

3. The food product of claim 1 wherein the penetration slots are evenly spaced apart longitudinally.

4. The food product of claim 1 wherein the penetration slots lie in the same plane.

5. The food product of claim 4 wherein the penetration slots are evenly spaced apart longitudinally.

6. The food product of claim 4 wherein each penetration slot has a width corresponding to a predetermined thickness dimension of the helical strips.

7. The food product of claim 1 wherein the penetration slots lie in a plurality of different planes.

8. The food product of claim 7 wherein the penetration slots are spaced apart longitudinally.

9. The food product of claim 7 wherein each penetration slot has a width corresponding to a predetermined thickness dimension of the helical strips.

10. The food product of claim 7 wherein the penetration slots are evenly spaced apart longitudinally.

11. A food product suitable for slicing into helical strips, comprising:

a whole vegetable or fruit having an outer surface and a longitudinal center axis;

the vegetable or fruit having a plurality of penetration slots which extend inwardly from the outer surface to the longitudinal center axis;

the slots being spaced apart longitudinally relative to the longitudinal center axis;

the slots having a thickness dimension, a longitudinal width dimension which extends longitudinally in parallel relationship to the longitudinal center axis, and a depth dimension which extends radially inwardly toward and hence substantially perpendicularly to the longitudinal center axis, the depth dimension terminating substantially at the longitudinal center axis.

12. The food product of claim 11 wherein each penetration slot has a width corresponding to a predetermined thickness dimension of the helical strips.

13. The food product of claim 11 wherein the penetration slots are evenly spaced apart longitudinally.

14. The food product of claim 13 wherein the penetration slots lie in the same plane.

15. The food product of claim 14 wherein each penetration slot has a width corresponding to a predetermined thickness dimension of the helical strips.

* * * * *